United States Patent Office 3,053,113
Patented Sept. 11, 1962

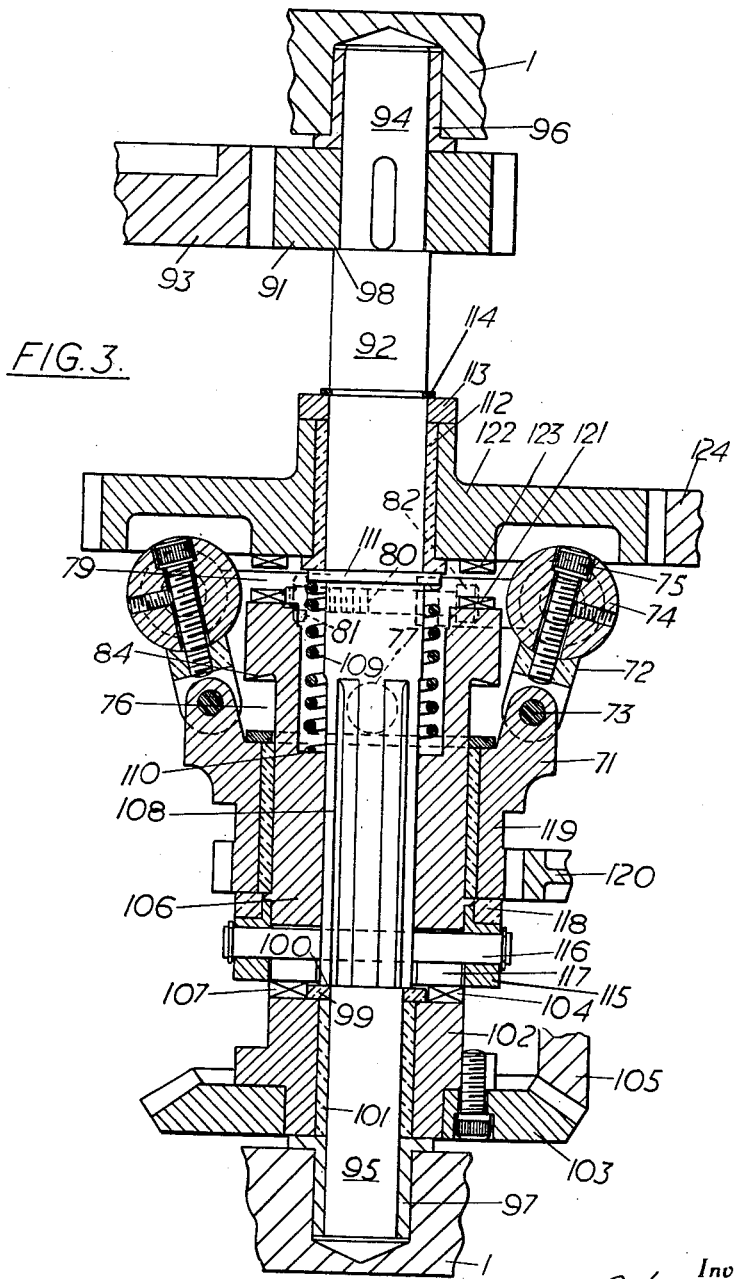

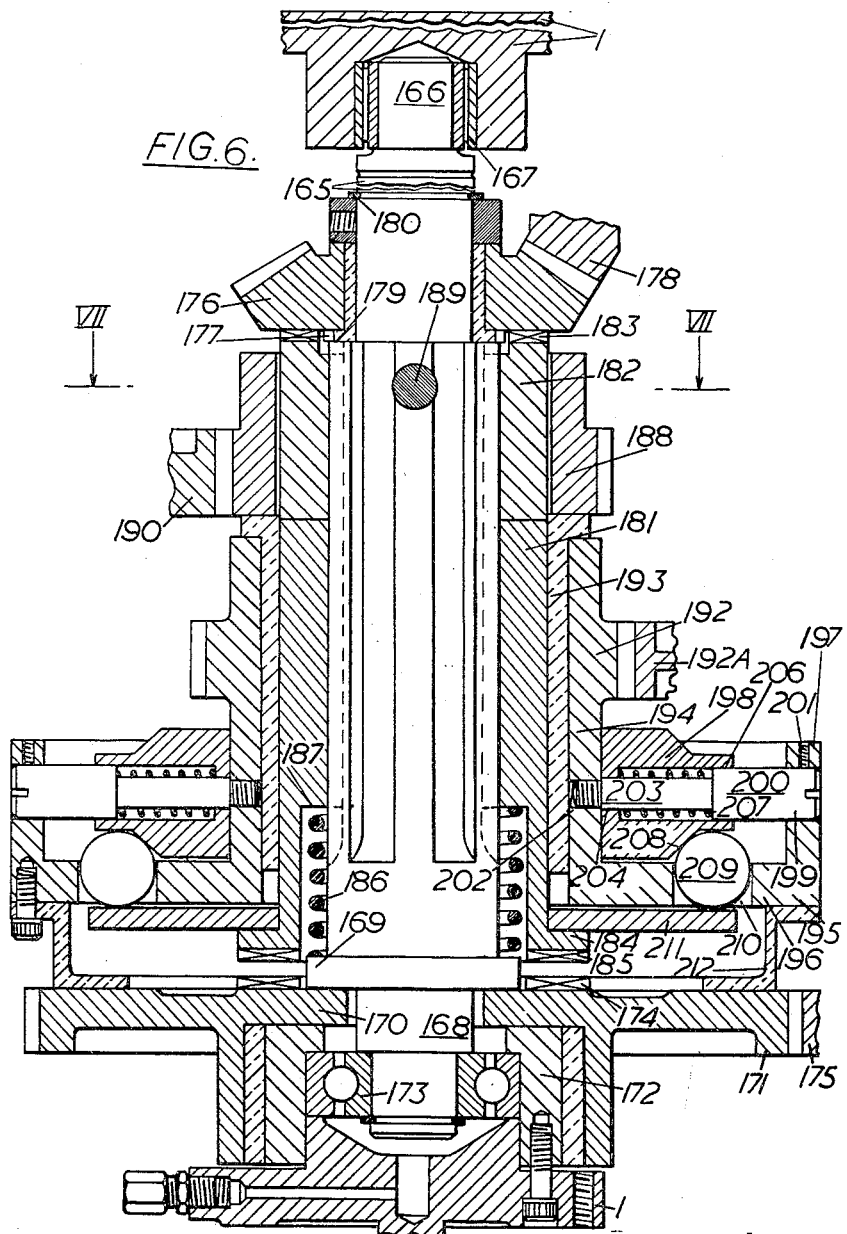

3,053,113
ACTUATORS FOR MEMBERS SUCH AS VALVES
Tadeusz Lang and Helmuts Abolins, Bradford, England, assignors to Jones Tate & Co. Ltd., Bradford, England, a British company
Filed Aug. 30, 1960, Ser. No. 52,919
Claims priority, application Great Britain Aug. 31, 1959
8 Claims. (Cl. 74—625)

This invention relates to actuators for members such as valves, an object of the invention being the provision of an improved form of actuator which may be operated by hand or by power as desired.

In an actuator for a member, such as a valve, operable alternatively manually or by a motor, according to the present invention clutch means include a portion movable, by a centrifugal device arranged to be driven by a motor, from a position to which the portion is biassed and in which a manually operable driving part is connected through the clutch means with a driven part to a position in which a motor operable driving part is connected through the clutch means with the driven part.

The invention will now be described, by way of example, with reference to the accompanying, partly diagrammatic, drawings, in which:

FIGURE 3 is a sectional elevation of an alternative form of part of the actuating mechanism;

FIGURE 6 is a sectional elevation of a further alternative arrangement of a part of the actuating mechanism.

Figure 1:
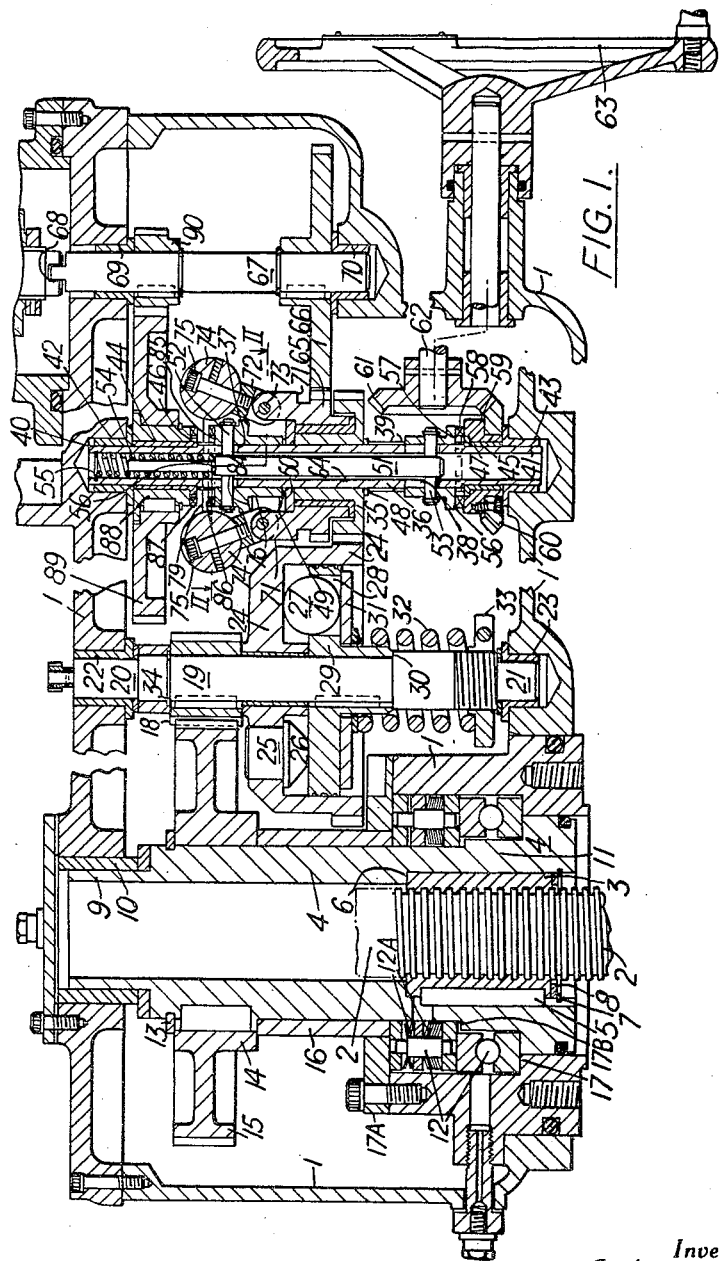
FIGURE 1 is a sectional elevation through various shafts of a valve actuating mechanism.

Referring to FIGURE 1 of the drawings, the actuating mechanism is enclosed in a casing 1, the output being delivered to a threaded valve spindle 2 arranged for axial movement. The threaded valve spindle 2 seats within a correspondingly threaded bush 3 positioned within a hollow sleeve 4 by a key 5 and held against an annular shoulder 6 by a circlip 7 and thrust washer 8. The upper end 9 of the sleeve 4 is of reduced external diameter and is mounted in a bearing 10 in the casing 1, whilst the lower end 11 of the sleeve 4 is of increased external diameter and is mounted in a ball thrust bearing 12, an assembly 12A of packs of spring washers spaced around the upper ring of the bearing being provided to absorb sudden axial impulses in either direction. The sleeve 4 is restrained from axial movement by a circlip 13 abutting a hub 14 of a spur wheel 15, the hub 14 in turn being supported on an outer sleeve 16 abutting the assembly 12A which is positioned on the ball thrust bearing 12 mounted on an annular shoulder 17 formed in the casing 1. Upward axial movement of the sleeve 4 is restrained by a restraining ring 17A secured to the casing 1 and abutting a part of the upper surface of the assembly 12A, any upward load being transmitted from an annular shoulder 17B formed on the sleeve 4 through the ball thrust bearing 12 to the assembly 12A.

The spur wheel 15 is keyed to the sleeve 4 and is driven by a pinion wheel 18 keyed to a drive shaft 19. The shaft 19 is formed with upper and lower ends 20, 21 of reduced diameter and is mounted in upper and lower step bearings 22, 23 in the casing 1.

The drive is transmitted to the shaft 19 through a dished gear wheel 24 freely mounted on the shaft 19 and provided with three, equiangularly spaced pawls 25, one of which is shown in FIGURE 1, each having a frusto-conical head 26 arranged to engage a corresponding ball 27 carried in a cylindrical aperture 28 in a flanged disc 29 keyed to the shaft 19 and resting on an annular shoulder 30 formed on the shaft. The balls 27 are biassed upwardly and held in contact with the frusto-conical heads 26 of the pawls 25 by a retaining plate 31 and a calibrated spring 32 extending between the retaining plate 31 and a collar 33 threaded onto the lower end 21 of the shaft 19. Upward movement of the flanged disc 29, the dished gear wheel 24 and the pinion wheel 18 is restrained by a circlip 34 extending around the upper end 20 of the shaft 19. Upon the dished gear wheel 24 being driven, the frusto-conical heads 26 of the pawls 25 tend to depress and ride over the balls 27. Since the calibrated spring 32 opposes downward movement of the balls 27 and retaining plate 31, such downward movement is proportional to the torque transmitted from the pawls 25 to the balls 27 and may be utilised to operate a torque limit switch (not shown) arranged to de-energise an electric motor driving, in a manner described below, the dished gear wheel 24 when a predetermined value of torque occurs in the drive. In addition, should the torque limit switch not be effective to interrupt the drive, the stiffness of the calibrated spring is such that the pawls 25 may force the balls 27 downwardly to such an extent as to be able to ride over them, and thereby provide slip in the drive, should the valve spindle 2 meet an impediment in its travel causing an objectionable value of torque to be set up. In such circumstances, on riding over the pawls 25, the balls 27 impact on the dished gear wheel 24 and succeeding pawls 25 under the influence of the calibrated spring 32, so that audible warning of the objectionable value of torque is given. It will be understood that such an arrangement is also advantageous in circumstances when the dished gear wheel 24 is manually driven, in a manner as is described below.

The dished gear wheel 24 meshes with a dished pinion wheel 35 splined to a hollow shaft 36 formed with upper and lower axially extending slots 37, 38 and splines 39. The drive from the hollow shaft 36 to the shaft 19 is speed decreasing since the dished pinion wheel 35 is of smaller diameter than the dished gear wheel 24. The hollow shaft 36 is formed with upper and lower ends at 40, 41 of reduced diameter and is mounted in upper and lower step bearings 42, 43 in the casing 1, upper and lower wheel bearings 44, 45 extending intermediate respective step bearings 42, 43 and upper and lower shoulders 46, 47 formed on the hollow shaft 36. The splines 39 extend intermediate the upper and lower shoulders 46, 47. The dished pinion wheel 35 is splined to the hollow shaft 36 and is axially retained in position on the hollow shaft by means of a lower circlip 48 and an upper circlip 49 together with a thrust washer 50. A clutch shaft 51 extends within the hollow shaft 36 and is provided with upper and lower pins 52, 53 respectively extending through the upper and lower slots 37, 38 in the hollow shaft. A spring 54 extending between an internal circlip 55 positioned within the upper end 40 of the hollow shaft 36, and a shoulder 56 formed above the upper pin 52 on a clutch shaft 51, biasses the clutch shaft in a downward direction. The lower pin 53 carries a lower dog clutch 56 splined to the hollow shaft 36 and formed with dogs 57 and is biassed by the spring 54 into engagement downwardly so that the dogs 57 engage dogs 58 formed on the hub 59 of a hand operated bevel wheel 60 freely rotatable on the hollow shaft 36. The hand operated bevel wheel 60 is driven by a bevel wheel 61 mounted on a hand wheel shaft 62 extending through the casing 1 and provided with a hand wheel 63.

Figure 2:
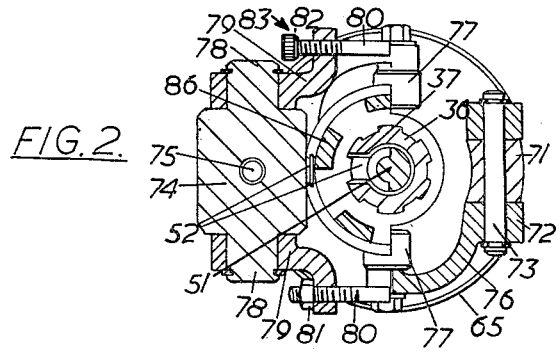
FIGURE 2 is an enlarged sectional plan view taken on the line II—II of FIGURE 1.

Freely mounted on the hub 64 of the dished pinion wheel 35 is a clutch pinion wheel 65 meshing with a clutch spur wheel 66 mounted on a motor extension shaft 67 connected with an output shaft 68 of an electric motor (not shown). The electric motor is reversible and is controlled by suitable means including limit switches. The motor extension shaft 67 is mounted in suitable upper and lower bearings 69, 70 in the casing 1. The gearing is speed increasing from the motor extension shaft 67 to the clutch pinion wheel 65. The clutch pinion wheel 65 is provided with two, diametrically opposed lugs 71 each of which supports a saddle 72 by means of a pin 73 extending through the lug 71 and saddle 72. Each saddle 72 carries a cylindrical weight 74 secured to the saddle by a recessed head screw 75 and is formed with an arm 76 (as shown in FIGURE 2) provided with a roller cam follower 77. The ends 78 of the cylindrical weight 74 are of reduced diameter and brackets 79 are rotatably mounted thereon, adjacent brackets on the respective cylindrical weights 74 being loosely connected together by a bolt 80 threaded into a first bracket and secured by a locking nut 81 and extending freely through a second bracket, the head 82 of the bolt being spaced from the second bracket, thereby forming a restricted yoke 83. The roller cam followers 77 are arranged to engage the lower surface 84 of an upper dog clutch 85, formed with dogs 86, splined to the hollow shaft 36 and mounted on the upper pin 52 of the clutch shaft 51. Dogs 87 are provided on the hub 88 of a motor spur wheel 89 which is freely mounted on the hollow shaft 36 and meshes with a motor pinion wheel 90 keyed to the motor extension shaft 67. The drive from the motor extension shaft 67 through the motor pinion wheel 90 to the motor spur wheel 89 is speed decreasing since the motor pinion wheel 90 is of smaller diameter than the motor spur wheel 89.

Upon energising the electric motor to rotate the motor extension shaft 67 in either direction, the clutch spur wheel 66 drives the clutch pinion wheel 65 so that the cylindrical weights 74 carried on the clutch pinion wheel 65 are rotated about the axis of the clutch shaft 51 and moved in an outward direction due to the centrifugal force. Movement of the cylindrical weights 74 in an outward direction causes the roller cam followers 77 to move in an upward direction thereby moving the upper dog clutch 85 in an upward direction. Movement of the upper dog clutch 85 is transmitted through the upper pin 52, the clutch shaft 51 and the lower pin 53 to the lower dog clutch 56 to move the dogs 57, against the action of the spring 54, out of engagement with the dogs 58 on the hub 59. Further movement of the roller cam followers 77 in an upward direction causes the dogs 86 on the upper dog clutch 85 to engage the dogs 87 on the hub 88. Thus the drive from the electric motor is transmitted through the motor pinion wheel 90, the motor spur wheel 89, the upper dog clutch 85 and the hollow shaft 36 to the dished pinion wheel 35. The dished pinion wheel 35 in turn drives the gear wheel 24, the pinion wheel 18 and the spur wheel 15 to rotate the sleeve 4 and axially move the valve spindle 2. Since the clutch pinion wheel 65 is also rotated from the motor extension shaft 67, the cylindrical weights 74 remain in an outwardly displaced position, and the dogs 86 of the upper dog clutch 85 are held in engagement with the dogs 87 on the hub 88. The restraining yoke 83 acts to prevent movement of the cylindrical weights 74 in an outward direction further than that necessary to hold the dogs 86 in engagement with the dogs 87.

Upon de-energising the electric motor the clutch pinion wheel 65 slows down and stops rotating so that the centrifugal force upon the cylindrical weights 74 is removed and the spring 54 acts to move the clutch shaft 51 in a downward direction to disengage the dogs 86 of the upper dog clutch 85 from the dogs 87 and, upon further downward movement to engage the dogs 57 on the lower dog clutch 56 with the dogs 58 on the hub 59 of the hand operated bevel wheel 60, the roller cam followers 77 being biassed by the spring 54 in a downward direction and the cylindrical weights 74 in an inward direction. It will be understood that since the dogs 57 on the lower dog clutch 56 engage the dogs 58, the drive is transmitted through the hand wheel 63, the bevel wheel 61, the hand operated bevel wheel 60, the lower dog clutch and the hollow shaft 36 to the dished pinion wheel 35 so that the valve spindle 2 may thereby be operated by hand.

It will be appreciated that, due to the arrangement of the upper and lower dog clutches 85, 56 and the clutch shaft 51, energisation of the motor automatically disconnects the drive from the hand wheel 63 and then connects the drive to the motor, whilst de-energisation of the motor automatically disconnects the drive from the motor and then connects the drive to the hand wheel 63.

In the alternative arrangement of a part of the actuating mechanism shown in FIGURE 3 of the drawings, a pinion wheel 91 keyed to a shaft 92 engages with an output gear wheel 93 similar to the dished gear wheel 24 shown in FIGURE 1. The shaft 92 is formed with upper and lower ends of reduced diameter which are positioned within upper and lower step bearings 96, 97 in the casing 1. The upper end 94 is axially positioned by means of an annular shoulder 98 against which abuts the pinion wheel 91 which in turn abuts against the upper step bearing 96. The lower step bearing is axially positioned by means of a washer 99 abutting an annular shoulder 100 and a wheel bearing 101 positioned intermediate the washer 99 and the lower step bearing 97. The hub 102 of a hand operated bevel wheel 103 is rotatably mounted upon the wheel bearing 101 and is formed with dogs 104. The hand operated bevel wheel 103 meshes with a bevel wheel 105 similar to the bevel wheel 61 shown in FIGURE 1. A two-way clutch 106 formed with lower dogs 107 is mounted on the shaft 92, splines 108 preventing rotation of the two-way clutch relative to the shaft. A spring 109 extends within an upper part of the two-way clutch 106 around the shaft 92 and abuts, at its lower end, a shoulder 110 on the two-way clutch 106 and, at its upper end, a collar 111 formed on the shaft 92. A wheel bearing 112 extends between the collar 111 and a thrust washer 113 and is restrained from upward movement by a circlip 114 secured to the shaft 92.

A clutch collar 115 is secured to the shaft by a pin 116 extending through the shaft 92 and through axial slots 117 in the two-way clutch 106. A ring bearing 118 supports the clutch pinion wheel 119 above the clutch collar 115, the clutch pinion wheel 119 being freely rotatably mounted on the two-way clutch 106. The hub of the clutch pinion wheel 119 is provided with diametrically opposed lugs 71 similar to those described in connection with FIGURES 1 and 2, the lugs 71 supporting arms 72 provided with cylindrical weights 74 and roller cam followers 77 arranged to engage a surface 84 on the two-way clutch 106. The clutch pinion wheel 119 meshes with a clutch spur wheel 120 similar to the clutch spur wheel 66 shown in FIGURE 1. The upper end of the two-way clutch is formed with dogs 121. A motor spur wheel 122 provided with dogs 123 is freely rotatably mounted on the wheel bearing 112 and meshes with a motor pinion wheel 124 similar to the motor pinion wheel 90 shown in FIGURE 1.

The arrangement shown in FIGURE 3 operates in a similar manner to that described in conjunction with FIGURES 1 and 2. The spring 109 biasses the two-way clutch 106 in a downward direction so that the dogs 107 engage the dogs 104 on the hub 102 of the hand operated bevel wheel 103, and the drive is transmitted from the hand wheel 63 through the bevel wheel 105, the hand operated bevel wheel 103, the two-way clutch 106 and the shaft 92 to the pinion wheel 91. The pinion wheel 91 in turn drives the gear wheel 93 to actuate the valve spindle 2 in a manner similar to that described in conjunction with FIGURE 1.

Upon energisation of the electric motor, the clutch pinion wheel 119 is rotated, so that the cylindrical weights 74 are rotated and caused to move in an outward direction due to the centrifugal force, the roller cam followers 77 thereby being moved in an upward direction. Upward movement of the roller cam followers 77, against the action of the spring 109, moves the two-way clutch 106 upwardly and the dogs 107 out of engagement with the dogs 104 on the hub 102 and, upon further upward movement, moves the dogs 121 into engagement with the dogs 123 on the motor spur wheel 122, thereby connecting the electric motor through the motor spur wheel 122, the two-way clutch 106, the shaft 92 and the pinion wheel 81 to the gear wheel 93 to actuate the valve spindle 2. The dogs 121 are held in engagement with the dogs 123 on the motor spur wheel 122 by the continued rotation of the clutch pinion wheel 119. As described in connection with FIGURES 1 and 2, de-energisation of the electric motor automatically disconnects the shaft 92 from the motor and connects the shaft 92 with the hand wheel 63.

Figure 4:
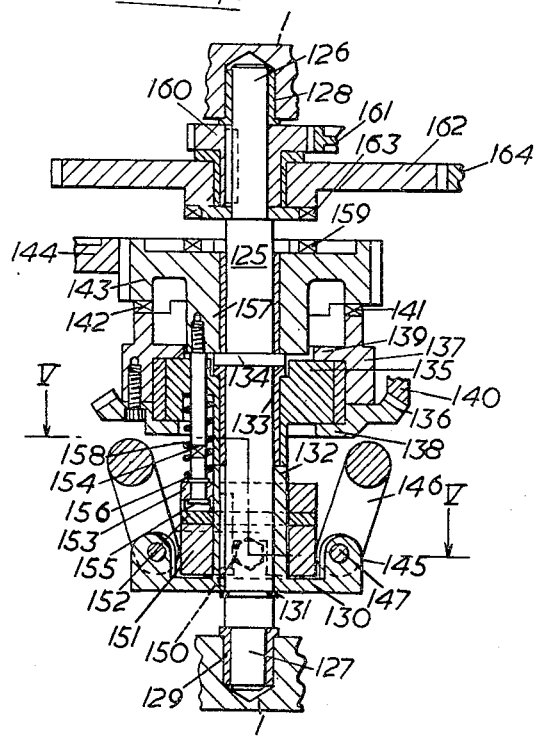
FIGURE 4 is a sectional elevation of a further alternative form of a part of the actuating mechanism.
Figure 5:
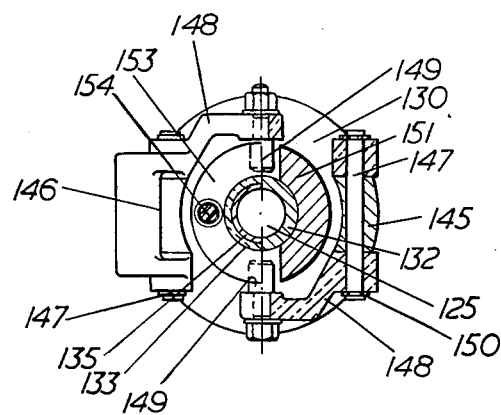
FIGURE 5 is a sectional plan view taken on the line V—V of FIGURE 4.

In the arrangement shown in FIGURES 4 and 5, a shaft 125 formed with upper and lower ends 126, 127 of reduced diameter is positioned with the upper and lower ends 126, 127 respectively in upper and lower step bearings 128, 129 in the casing 1. A weight carrier 130 is supported on a circlip 131 and is formed with a cylindrical hub 132 extending between the circlip 131 and a shaft bearing 133 which abuts a collar 134 formed upon the shaft 125. Axially fixed but freely rotatable upon the shaft bearing 133 is a bearing 135. A hand operated bevel wheel 136 and a hub 137, each provided with radial flanges 138, 139 fitting around the bearing 135, are freely rotatable thereupon. The hand operated bevel wheel 136 meshes with a bevel wheel 140 similar to the bevel wheel 61 shown in FIGURE 1. The hub 137 is formed with dogs 141 arranged to engage dogs 142 formed on an output pinion wheel 143 freely rotatable upon the shaft 125 and meshing with a dished gear wheel 144 similar to the dished gear wheel 24 shown in FIGURE 1.

The weight carrier 130 is provided with diametrically opposed lugs 145 each lug having a weight 146 pivotally mounted thereon by means of a pin 147. Each weight 146 is formed with an arm 148 provided with a stud 149 extending into axial slots 150 in a collar 151. Supported on the collar 151 is a thrust washer 152 and a top ring 153. Three rods 154, one of which is shown in FIGURES 4 and 5, extend through equiangularly spaced holes 155 in the top ring 153 and are secured to the top ring 153 by circlips 156. Each of the rods 154 extends freely through a hole in the bearing 135 and is screwed into a hub 157 of the output pinion wheel 143. Each rod 154 is provided with a spring 158 extending between the top ring 153 and the bearing 135 so that the top ring 153 and the clutch collar 151 together with the output pinion wheel 143 are biassed in a downward direction by the springs 158. The upper part of the output pinion wheel 143 is formed with dogs 159. A clutch pinion wheel 160 is keyed to the shaft 125 and meshes with a clutch spur wheel 161 similar to the clutch spur wheel 66 shown in FIGURE 1. A motor spur wheel 162 provided with dogs 163 is freely mounted on the hub of the clutch pinion wheel 160 and meshes with a motor pinion wheel 164 similar to the motor pinion wheel 90 shown in FIGURE 1.

In operation, the springs 158 bias the dogs 142 on the output pinion wheel into engagement with the dogs 141 on the hub 137 of the hand operated bevel wheel 136 so that the hand wheel 63 is operatively connected through the bevel wheel 140, the hand operated bevel wheel 136, the hub 137 and the output pinion wheel 143 to the dished gear wheel 144 which in turn actuates the valve spindle 2. Upon energisation of the electric motor the clutch pinion wheel 160 is rotated and rotates the shaft 125 together with the weight carrier 130. Upon rotation of the weight carrier 130, the weights 146 move in an outward direction due to the centrifugal force and the studs 149 move in an upward direction to move the collar 151 in an upward direction against the action of the springs 158. Upward movement of the clutch collar 151 is transmitted through the thrust washer 152, the top ring 153, the circlips 156 and the rods 154 to the output pinion wheel 143 to move the dogs 142 out of engagement with the dogs 141 on the hub 137 and, upon further upward movement of the clutch collar 151, to move the dogs 159 into engagement with the dogs 163 on the motor spur wheel 162, thereby operatively connecting the drive from the motor through the motor pinion wheel 164 and the motor spur wheel 162 to the output pinion wheel 143, the axial depth of the output pinion wheel 143 being such that upon upward movement the wheel still meshes with the dished gear wheel 144 to actuate the valve spindle 2. The dogs 159 on the output pinion wheel 143 are held in engagement with the dogs 163 by the continued rotation of the weight carrier 130. Upon de-energisation of the electric motor, the weight carrier 130 slows down and stops rotating and the springs 158 act to move the clutch collar 151, together with the output pinion wheel 143, downwardly to disengage the dogs 159 from the dogs 163 and, upon further downward movement to engage the dogs 142 with the dogs 141 on the hub 137. Thus upon de-energisation of the electric motor, the drive is automatically disconnected from the motor and then automatically connected with the hand wheel 63.

Figure 7:
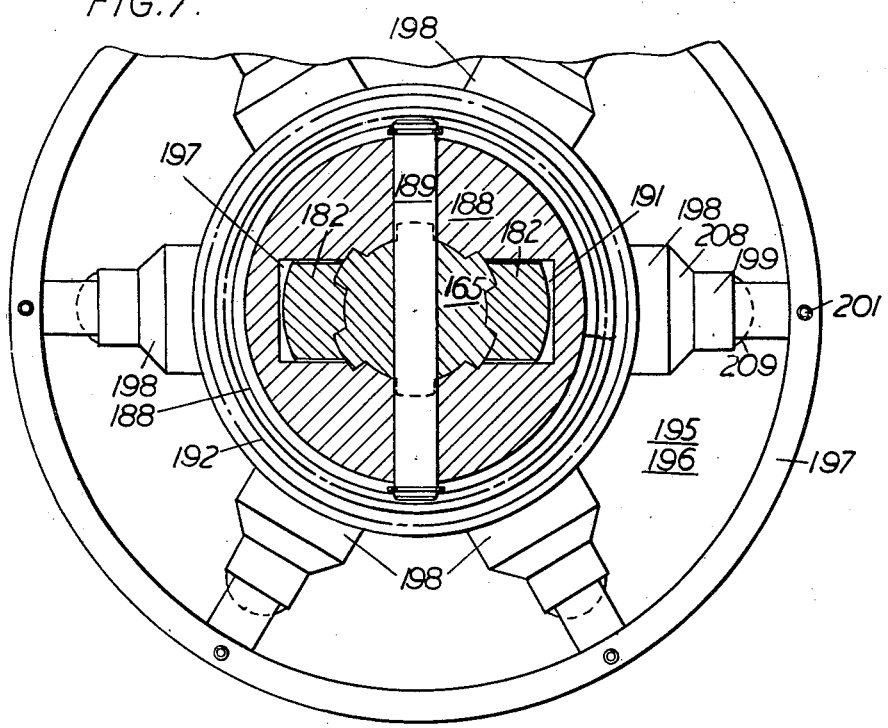
FIGURE 7 is a sectional plan view taken on the line VII—VII of FIGURE 6.

In the arrangement shown in FIGURES 6 and 7, the shaft 165 is positioned with its upper end 166 in a needle bearing 167 in the casing 1, and with its lower end 168 supported on a collar 169 resting on a hub 170 of a motor spur wheel 171 mounted on a bearing 172, secured to the casing 1, a ball bearing 173 radially positioning the end of the shaft. The motor operable spur wheel 171 is formed with dogs 174 and engages a motor pinion wheel 175 similar to the motor pinion wheel 90 shown in FIGURE 1. Freely rotatable on an upper part of the shaft 165 is a hand operated bevel wheel 176 formed with dogs 177 and engaging a bevel wheel 178 similar to the bevel wheel 61 shown in FIGURE 1. The hand operated bevel wheel 176 is axially located between a shoulder 179 formed on the shaft 165 and a circlip 180 extending around the shaft. A clutch sleeve 181 formed with axially extending arms or shoulders 182 is splined to the shaft 165. The shoulders 182 are formed with dogs 183. The lower end 184 of the clutch sleeve 181 is radially flanged and is provided with dogs 185. A spring 186 acts between the collar 169 and an annular shoulder 187 within the clutch sleeve 181 to bias the clutch sleeve in an upward direction. The output pinion wheel 188 is splined to the shaft 165, being axially secured by a pin 189, and engages a dished gear wheel 190 similar to the dished gear wheel 24 shown in FIGURE 1. The shoulders 182 of the clutch sleeve 181 extend through apertures 191 in the output pinion wheel 188. A clutch pinion wheel 192 is freely rotatable on the clutch sleeve 181, a wheel bearing 193 interposed between the clutch sleeve 181 and the clutch pinion wheel 192 having an upper end abutting the output pinion wheel 188 and is thereby restrained against upward movement. The clutch pinion wheel 192 engages a clutch spur wheel 192A similar to the clutch spur wheel 66 shown in FIGURE 1. The hub 194 of the clutch pinion wheel 192 extends axially and is formed with a dished flange 195 having radially and axially extending portions 196, 197. The dished flange 195 is provided with six weights 198 disposed at intervals around the flange, each being mounted upon a stud 199 having an outer portion 200 secured within the holes in the axially extending portion 197 of the dished flange 195 by grub screws 201, the inner portion 203 being formed with a screw thread 202 and screwed into the hub 194. The inner portion 203 of each stud 199 is of reduced diameter and fits within an inner portion 204 of a bore in the corresponding weight 198. The outer portion 200 of the stud 199 fits within an outer portion 206 of the bore in the weight 198. A spring 207 extends around the inner portion 203 between the end of the inner portion 204 of the bore and the outer portion 200 of the stud, thereby biassing the weight inwardly. Each weight 198 is formed with a frusto-conical face 208 arranged to abut an adjoining ball 209 positioned within a cylindrical hole 210 in the radially extending portion 195 of the dished flange 195. The balls 209 are supported upon a thrust plate 211 which rests on a flange 184 formed on a clutch sleeve 181. An annular bracket 212 secured to the dished flange 195 and abutting the motor spur wheel 171 restrains the hub 194 against downward axial movement.

In operation, the spring 186 biasses the dogs 183 into engagement with the dogs 177 on the hand operated bevel wheel 176, so that the drive is connected from the hand wheel 63 through the bevel wheel 178, the hand operated bevel wheel 176, the clutch sleeve 181, the shaft 165 and the output pinion wheel 188 to the dished gear wheel 190 which in turn actuates the valve spindle 2.

Upon energisation of the motor, the clutch pinion wheel 192 is rotated so that the weights 198 are rotated and move radially outwards against the action of the springs 207. The frusto-conical faces 208 on the weights 198 bear upon the balls 209 to move them, together with the thrust plate 211 in a downward direction against the action of the spring 186. Downward movement of the thrust plate 211 is transmitted through the clutch sleeve 181 to move the dogs 183 out of engagement with the dogs 177 on the hand operated bevel wheel 176 and, upon further downward movement of the thrust plate 211 move the dogs 185 into engagement with the dogs 174 on the motor spur wheel 171. Thus the drive is connected from the electric motor through the motor pinion wheel 175, the motor spur wheel 171, the clutch sleeve 181, the shaft 165 and the ouput pinion wheel 188 to the dished gear wheel 190, which, in turn, actuates the valve spindle 2. Upon de-energising of the electric motor, the clutch pinion wheel 192 slows down and stops rotating and the weights 198 move inwardly under the influence of the springs 207 thereby permitting the balls 209 together with the thrust plate 211 to move in an upward direction. Upward movement of the thrust plate 211 disengages the dogs 185 from the dogs 174 on the motor spur wheel 171 and upon further upward movement of the thrust plate 211 engages the dogs 183 with the dogs 177 on the hand operated bevel wheel 176.

What is claimed is:

1. An actuator for a member such as a valve, including a rotatably mounted shaft, mounted on said shaft a first, driving, gear wheel, a second, motor operable driven gear wheel, a third, manually operable, driven, gear wheel, a fourth, motor operated, driven, gear wheel and clutch means, a drive motor connected to the second, motor operable, driven, gear wheel through a speed increasing gear train and to the fourth, motor operated, driven gear wheel through a speed decreasing gear train, said clutch means including a movable portion biassed to connect the first, driving, gear wheel with the third, manually operable, driven, gear wheel, a centrifugal device connected with the second, motor operable, driven, gear wheel, means arranged upon rotation of the centrifugal device by the second, motor operable, driven, gear wheel to move the movable portion of the clutch means to disconnect the first, driving, gear wheel and the third, manually operable, driven, gear wheel and connect the first, driving, gear wheel with the fourth, motor operated driven, gear wheel.

2. An actuator as claimed in claim 1, in which the first, driving, gear wheel is mounted upon and secured to the rotatably mounted shaft and the second, motor operable, driven, gear wheel, the third, manually operable, driven, gear wheel and the fourth, motor operated, driven, gear wheel are each mounted upon the said shaft to be axially fixed but freely rotatable relative to the shaft.

3. An actuator as claimed in claim 1, in which the first, driving, gear wheel is mounted upon the rotatably mounted shaft to be axially movable and rotatable relatively to the shaft, the second, motor operable, driven, gear wheeel is mounted upon and secured to the said shaft and the third, manually operable, driven, gear wheel and the fourth, motor operated, driven, gear wheel are each mounted upon the said shaft to be axially fixed but rotatable relative to the shaft.

4. An actuator for a member such as a valve, including a rotatably mounted shaft, mounted upon the said shaft a first, driving, gear wheel, a second, motor operable, driven, gear wheel, a third, manually operable, driven, gear wheel, a fourth, motor operated, driven, gear wheel and clutch means, a drive motor connected to the second, motor operable, driven, gear wheel through a speed increasing gear train and to the fourth, motor operated, driven gear wheel through a speed decreasing gear train, the said clutch means including a movable portion axially movable upon the shaft and formed with a first and a second clutch member, the first clutch member for making connection with the third, manually operable, driven, gear wheel and the second clutch member for making connection with the fourth, motor operated, driven, gear wheel, a centrifugal device connected with the second, motor operable, driven, gear wheel including radially inwardly biassed weights arranged, upon the centrifugal device being driven by the second, motor operable, driven gear wheel, to move outwardly and to move the movable portion of the clutch means against a biassing spring from a position in which the first clutch member is effective to a position in which the second clutch member is effective.

5. An actuator for a member such as a valve, including a hollow shaft, a spindle axially movable within the shaft, a first, driving, gear wheel mounted on and secured to the shaft, a second, motor operable, driven, gear wheel, a third, manually operable, driven, gear wheel and a fourth, motor operated, driven, gear wheel each mounted upon the shaft to be axially fixed but freely rotatable relative to the shaft, a drive motor connected to the second, motor operable, driven, gear wheel through a speed increasing gear train and to the fourth, motor operated, driven gear wheel through a speed decreasing gear train, clutch means including a first and a second clutch member each connected by pins passing through axially extending slots in the shaft to the spindle, the first clutch member making connection with the third, manually operable, driven, gear wheel and the second clutch member making connection with the fourth, motor operated, driven, gear wheel, a centrifugal device connected with the second, motor operable, driven, gear wheel and means arranged upon rotation of the centrifugal device by the second, motor operable, driven, gear wheel to move the spindle against a biassing spring contained in the shaft from a position in which the first clutch member is effective to a position in which the second clutch member is effective.

6. An actuator for a member such as a valve, including a rotatably mounted shaft, mounted on said shaft a first, driving, gear wheel, a second, motor operable, driven, gear wheel, a third, manually operable, driven, gear wheel, a fourth, motor operated, driven, gear wheel and clutch means, a drive motor connected to the second, motor operable, driven, gear wheel through a speed increasing gear train and to the fourth, motor operated, driven gear wheel through a speed decreasing gear train, said clutch means including a movable portion biassed to connect the first, driving, gear wheel with the third, manually operable, driven, gear wheel, a centrifugal device provided with weight carrying levers pivotally mounted on the second, motor operable, driven, gear wheel having arms each provided with a roller engaging a surface on the movable portion of the clutch means arranged upon rotation of the centrifugal device by the second, motor operable, driven gear wheel to move the movable portion to disconnect the first, driving, gear wheel and the third, manually operable, driven, gear wheel and to connect the first, driving, gear wheel with the fourth, motor operated, driven, gear wheel.

7. An actuator for a member such as a valve, including a rotatably mounted shaft, mounted on said shaft a first, driving, gear wheel, a second, motor operable, driven, gear wheel, a third, manually operable, driven, gear wheel, a fourth, motor operated, driven, gear wheel and clutch means, a drive motor connected to the second, motor operable, driven gear wheel through a speed increasing gear train and to the fourth, motor operated, driven gear wheel through a speed decreasing gear train, said clutch means including a movable portion biassed to connect the first, driving, gear wheel with the third, manually operable, driven, gear wheel, a centrifugal device formed with a hub connected with the second, motor operable, driven, gear wheel, said hub carrying radially extending, cylindrical rods each provided with a shoulder, mounted on each cylindrical rod a weight having a stepped bore, a spring extending around the cylindrical rod within the stepped bore between the shoulder formed on the cylindrical rod and the stepped portion of the bore biassing the weight radially inwardly, each of the weights being formed with a sloping face co-acting with a member having a rolling surface arranged upon rotation of the centrifugal device by the second, motor operable, driven, gear wheel and outward movement of the weights to move the movable portion of the clutch means to disconnect the first, driving, gear wheel and the third, manually operable, driven, gear wheel and to connect the first, driving, gear wheel with the fourth, motor operated, driven, gear wheel.

8. An actuator for a member such as a valve, including an output gear wheel, a rotatably mounted shaft, mounted on said shaft a first, driving, gear wheel, a second, motor operable, driven, gear wheel, a third, manually operable, driven, gear wheel, a fourth, motor operated, driven, gear wheel and clutch means, a drive motor connected to the second, motor operable, driven, gear wheel through a speed increasing gear train and to the fourth, motor operated, driven gear wheel through a speed decreasing gear train, said clutch means including a movable portion biassed to connect the first, driving, gear wheel with the third, manually operable, driven, gear wheel, a centrifugal device connected with the second, motor operable, driven, gear wheel, means arranged upon rotation of the centrifugal device by the second, motor operable, driven, gear wheel to move the movable portion to disconnect the first, driving, gear wheel and the third, manually operable, driven, gear wheel and to connect the first, driving, gear wheel with the fourth, motor operated, driven, gear wheel, an overload device connecting the first, driving, gear wheel with the output gear wheel, said overload device including pawls each having a sloping face and balls each biassed into contact with the respective faces to transmit the drive, the biassing force being such as to permit movement of the balls over the sloping faces a distance proportional to the torque being transmitted, switch means operable to interrupt the drive upon the balls moving a predetermined distance over the sloping faces, the sloping faces being of such length as to permit the balls to ride over the sloping faces upon failure of the switch means to interrupt the drive.

References Cited in the file of this patent
UNITED STATES PATENTS

| | | |
|---|---|---|
| 2,694,320 | Kron | Nov. 16, 1954 |
| 2,703,991 | Kron et al. | Mar. 15, 1955 |
| 2,745,294 | Kron | May 15, 1956 |
| 2,855,947 | Millerville | Oct. 14, 1958 |
| 2,916,947 | Morrell | Dec. 15, 1959 |